Figure 1:
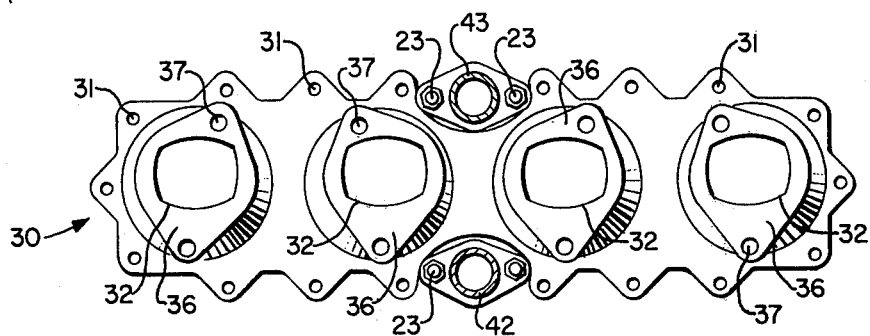

United States Patent [19]
Marsee

[11] 3,972,313
[45] Aug. 3, 1976

[54] METHOD AND APPARATUS FOR HEATING AN INTAKE SYSTEM ON AN INTERNAL COMBUSTION ENGINE
[75] Inventor: Frederick J. Marsee, Clawson, Mich.
[73] Assignee: Ethyl Corporation, Richmond, Va.
[22] Filed: Dec. 26, 1973
[21] Appl. No.: 428,458

[52] U.S. Cl. .................. 123/122 A; 123/122 R; 123/141; 165/52
[51] Int. Cl.² ........................................ F02M 31/00
[58] Field of Search ........ 123/122 D, 122 R, 122 A, 123/141; 165/52

[56] References Cited
UNITED STATES PATENTS

| | | | |
|---|---|---|---|
| 1,278,558 | 9/1918 | Arndt | 123/122 A |
| 1,392,168 | 9/1921 | Johnson | 123/122 A |
| 1,706,623 | 3/1929 | Link | 123/122 A |
| 1,786,233 | 12/1930 | Ferrara | 123/122 A |
| 2,001,669 | 5/1935 | Smith | 123/122 A |
| 2,833,261 | 5/1958 | August | 123/122 D |
| 2,846,989 | 8/1958 | Eskew | 123/122 D |
| 3,139,874 | 7/1964 | Krein | 123/122 A |
| 3,762,385 | 10/1973 | Hollnagel | 123/122 A |

FOREIGN PATENTS OR APPLICATIONS

| | | | |
|---|---|---|---|
| 52,341 | 2/1944 | France | 123/122 A |
| 503,653 | 9/1919 | France | 123/122 A |

Primary Examiner—Charles J. Myhre
Assistant Examiner—R. H. Lazarus
Attorney, Agent, or Firm—Donald L. Johnson; John F. Sieberth; Robert A. Linn

[57] ABSTRACT

A method and apparatus for heating the air-fuel mixture in the intake system or intake manifold of an internal-combustion engine which includes a heat exchanger heated by the exhaust gases out of the engine located between the carburetor of an internal-combustion engine and the engine cylinders. The air-fuel mixture is heated by passing through the heat exchanger and around the heat exchanger ports. The temperature of the heat exchanger can be varied to insure maximum vaporization of the fuel in the air stream.

12 Claims, 8 Drawing Figures

METHOD AND APPARATUS FOR HEATING AN INTAKE SYSTEM ON AN INTERNAL COMBUSTION ENGINE

BACKGROUND OF THE INVENTION

The present invention relates to a method of operating an internal-combustion engine having one or more cylinders. More particularly, the invention provides an apparatus and method for improving the cold start warm-up characteristics and fuel distribution of an internal-combustion engine.

It is well known in the art that cold start warm-up characteristics can be improved by the use of a water-heated intake manifold. However, water-heated intake manifolds have several disadvantages, one of which is the length of time necessary for warming the water in the engine to heat the intake manifold.

THE INVENTION

In accordance with the present invention there is provided a method and apparatus for heating the air-fuel mixture flowing from a carburetor or other air-fuel mixing device to the cylinders of an internal-combustion engine by locating a heat exchanger heated by the exhaust gases of the engine between the carburetor, or other air-fuel mixing device, and the engine cylinders to heat the air-fuel mixture flowing to the engine cylinders. The heat exchanger may also be adapted to heat the idle mixture flowing from the carburetor to the engine cylinders. Tubes can also be used in the heat exchanger to acoustically tune the intake system or intake manifold internally to improve power output.

Figure 2:
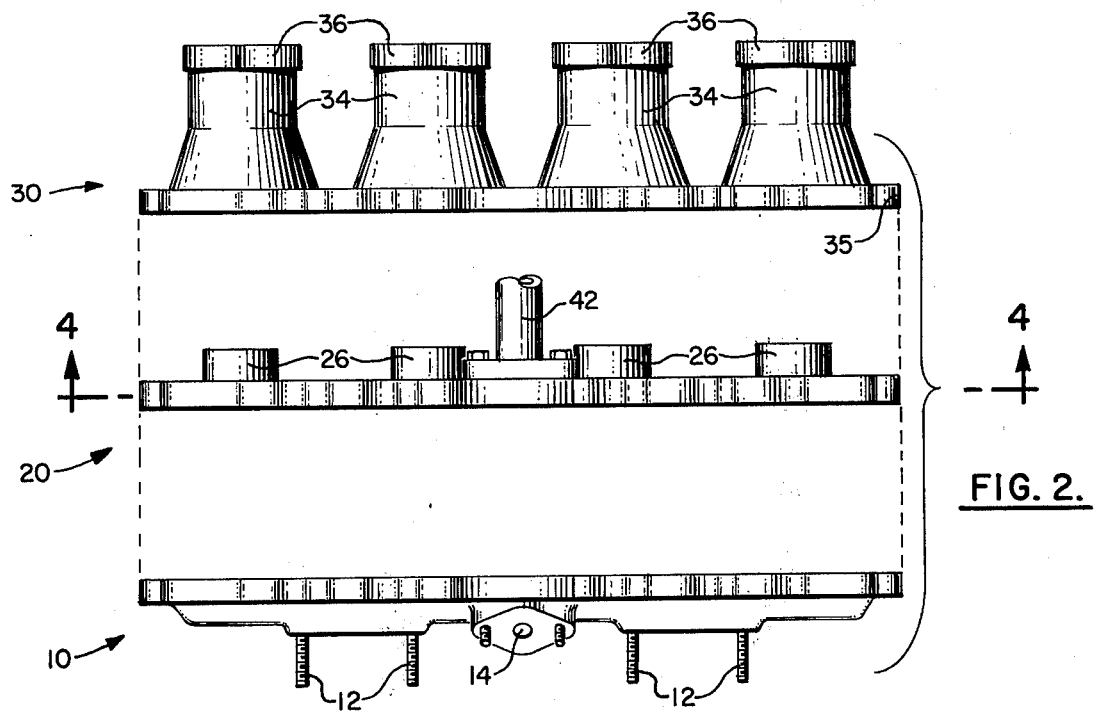
Figure 3:
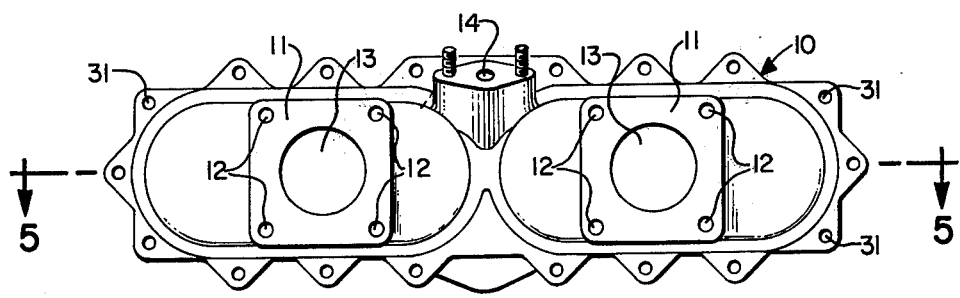
Figure 4:
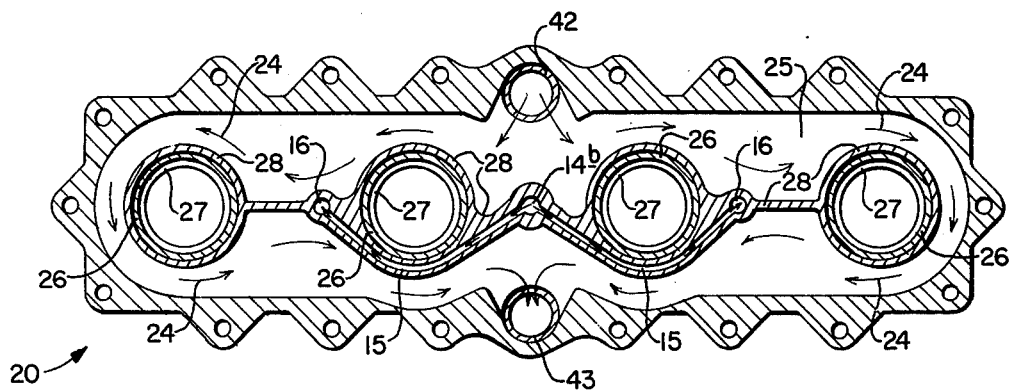
Figure 5:
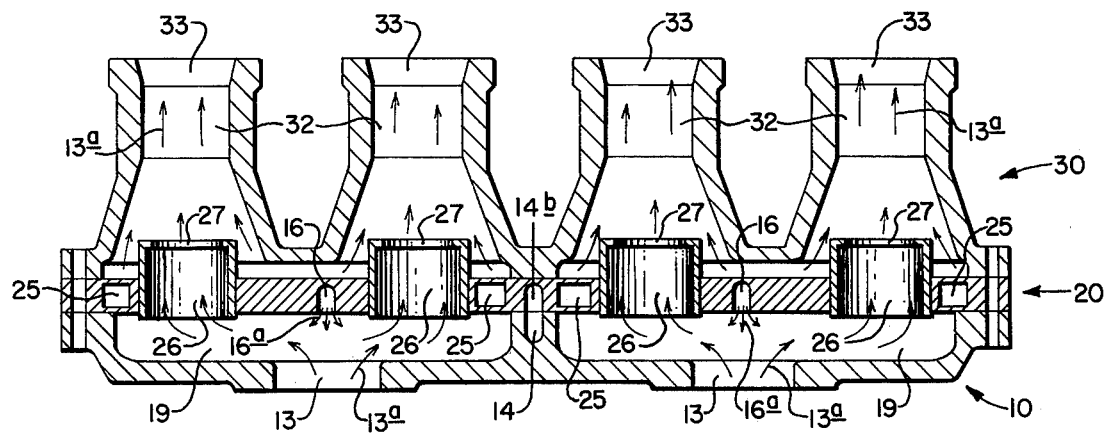
Figure 6:
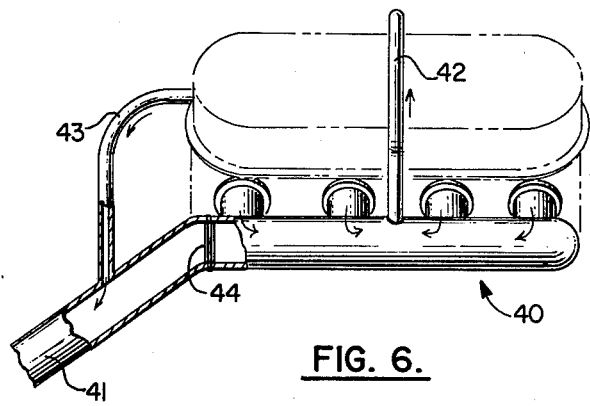
Figure 7:
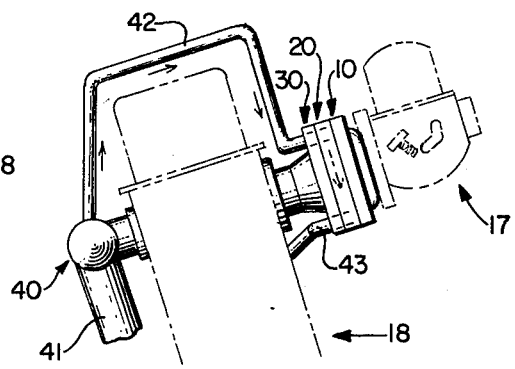
Figure 8:
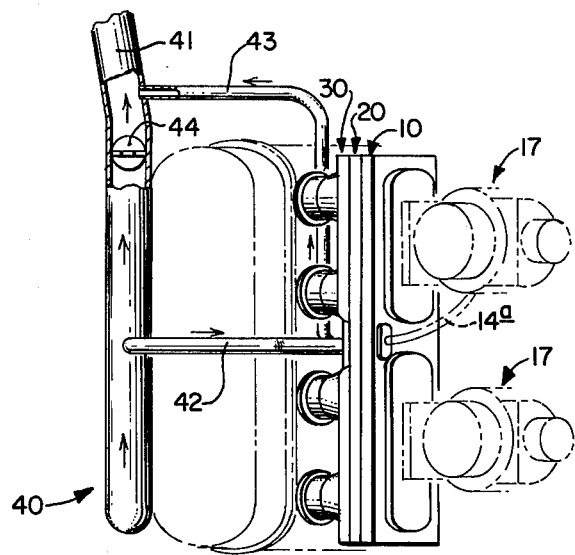

The invention will be more clearly understood by reference to the drawings in which:

FIG. 1 - is a partly sectional plan view of the intake system of the present invention, FIG. 2 - is an exploded side plan view of the intake system of the present invention, FIG. 3 - is a plan view of the carburetor side of the manifold assembly of the present invention, FIG. 4 - is a sectional view taken along lines 4—4 of FIG. 2, FIG. 5 - is a sectional view taken along lines 5—5 of FIG. 3, FIG. 6 - is a perspective view of the exhaust side of an engine employing the apparatus of the present invention, FIG. 7 - is a front plan view of an engine employing the apparatus of the present invention, and FIG. 8 - is a top plan view of an engine employing the apparatus of the present invention.

Referring now to the drawings, in FIGS. 1, 2, and 6–8 is shown the engine mounting plate indicated generally by the numeral 30, which is connected to the engine generally indicated by the numeral 18 in FIGS. 6, 7, and 8 by bolts (not shown) which fit through bolts 37 located on flanges 36 of connectors 34. Connectors 34 are connected to plate 35 and have hollow chambers 32 therein for the passage of the air-fuel mixture, as shown in FIGS. 1 and 5.

Connected to engine mounting plate 30 is a heat exchanger generally indicated by the numeral 20 shown in FIG. 2 and sectionally in FIG. 4 and in FIG. 5. Heat exchanger 20 has a series of tubes 26 connected thereto which are aligned with connectors 34 and chambers 32. In FIG. 4, heat exchanger 20 can be seen to have an internal chamber 25 located therein into which exhaust gases enter through inlet 42, as indicated by arrows 24. The exhaust gases flow in the direction indicated by arrows 24 around interior walls 28 and through outlet 43, thereby heating walls 28. Tubes 26 are connected to walls 28 and are heated by walls 28. Heat exchanger 20 may also contain idle mixture inlet passageway 14b for the receipt of the idle mixture. The air-fuel mixture entering through inlet 14b travels through passageway 15 and walls 28 as indicated by the arrows. The idle fuel mixture exits through outlet 16 as shown in FIGS. 4 and 5, and as indicated by arrow 16a.

The air exiting from idle mixture outlet 16 enters chambers 19—19 of the carburetor mounting plate generally indicated by the numeral 10. Idle mixture inlet 14 can be seen in FIGS. 2 and 5 to extend upwardly through the outer side of carburetor mounting plate 10 and to be aligned with idle mixture inlet 14b. Idle mixture inlet passage 14 is connected to idle mixture line 14a, shown in FIG. 8. Carburetor mounting plate 10 also contains air-fuel mixture inlets 13—13 through which the air-fuel mixture, indicated by the arrows 13a, from carburetors 17—17 passes into chambers 19—19. When the engine is in operation, the air-fuel mixture continues to flow through tubes 26 into chambers 32 and outwardly through air-fuel mixture outlet 33. Carburetors 17—17 are attached to mounting plate 10 by bolts 12 in flange 11. From air-fuel mixture outlet 33 the air-fuel mixture passes into the engine cylinders (not shown). Plate 10, heat exchanger 20 and plate 30 are connected by bolts 31.

Tubes 26 are optional, but are preferably used with the heat exchanger of the present invention to acoustically tune the manifold internally to improve power output. For example, when tubes 26 were employed in the operation of a test engine at 4400 RPM, full throttle, the torque was increased from 102.4 ft/lb to 105.6 ft/lb by the use of the tubes. The tubes 26 preferably have a lip 27 thereon which promotes turbulence and therefore mixing in the air-fuel mixture. The lip can also trap liquid fuel which can be reintroduced into the air stream by the shear of the air over the trapped fuel.

Referring now to FIGS. 6–8, the apparatus of the present invention can be seen to operate in the following manner. A valve 44 is located within the exhaust manifold generally indicated by the numeral 40 to open and close the exhaust gas passageway within manifold 40. When valve 44 is closed as indicated in FIG. 6, exhaust gases flow upward through exhaust gas inlet 42 to heat exchanger 20 as indicated by the arrows. The exhaust gases flow through heat exchanger 20, as previously indicated, and through exhaust gas outlet 43 and into exhaust pipe 41, as indicated by the arrows in FIG. 6.

When valve 44 is open, as indicated in FIG. 8, a portion of the exhaust gases will pass through valve 44 and enter exhaust pipe 41, as indicated by the arrows in FIG. 8, and a portion will pass sequentially through exhaust gas inlet 42, heat exchanger 20, exhaust gas outlet 43 and on to exhaust pipe 41, thereby continuing the heating of heat exchanger 20 even when valve 44 is fully open. The amount of heating and the temperature of heat exchanger 20 can be varied by varying the amount valve 44 is opened.

It should be understood that in accordance with the present invention heat exchanger 20 could be connected to engine 18 by various means well known in the art other than engine mounting plate 30. For example, tubes 26 could be provided with flanges which bolt directly to the engine, or tubes 26 might be eliminated or shortened, and gas inlet 42 and outlet 43 be modified to allow plate 20 to be bolted directly to the engine.

In addition, carburetor mounting plate 10 might be modified to receive more than two carburetors, or to receive just one carburetor. However, it is preferred that carburetor mounting plate 10 contain two carburetors having inlets 13 which are not directly in alignment with tubes 26 or the holes in heat exchanger 20 in which tubes 26 are received so that the air-fuel mixture flowing through inlets 13 impinge upon the flat surface of heat exchanger 20 before turning to flow through tubes 26. Such a preferred arrangement, depicted in FIGS. 1–5, allows greater heating of the air-fuel mixture.

However, carburetor mounting plate 10 could be eliminated and carburetors equal in number to tubes 26 could be bolted directly to heat exchanger 20 in alignment with tubes 26. Outlets could be provided in each tube 26 for the idle mixture flowing through heat exchanger 20.

Having fully described the present invention, it is desired that it be limited only within the spirit and scope of the following claims.

What is claimed is:

1. In combination with an internal-combustion engine an apparatus for heating the air-fuel mixture and/or the idle air-fuel mixture of said internal-combustion engine having one or more cylinders prior to the entrance of the air-fuel mixture and/or idle air-fuel mixture into the cylinders of the engine comprising,
   a. heat exchanger means for heating said air-fuel mixture and/or said idle air-fuel mixture, said heat exchanger means including
      i. internal chamber means through which hot exhaust gases flow,
      ii. at least one exhaust gas inlet through which said gases enter said chamber means and at least one exhaust gas outlet through which the exhaust gases exit said chamber means,
      iii. interior walls disposed in said internal chamber means, said walls defining a plurality of generally cylindrical passage means extending through said internal chamber means,
      iv. tube means disposed in said passage means through which said air-fuel mixture and/or idle air-fuel mixture flows,
   b. engine mounting plate means connected to said heat exchanger means and disposed downstream thereof for connecting said heat exchanger means to said engine and including hollow chamber means generally aligned with said tube means for receiving said air-fuel and/or said idle air-fuel mixture heated by said heat exchanger,
   c. carburetor mounting plate means connected to said heat exchanger means and disposed upstream thereof for connecting at least one carburetor means to said heat exchanger means and including chamber means for receiving said air-fuel and/or said idle air-fuel mixture from said carburetor means, and
   d. means for conducting exhaust gases from said engine to said heat exchanger means.

2. The apparatus of claim 1 wherein said tube means comprises hollow, open-ended, generally cylindrical-shaped tubes.

3. The apparatus of claim 1 wherein said tube means has lip means therein for increasing the turbulence of said air-fuel mixture.

4. The apparatus of claim 1 wherein said heat exchanger means has means through which said idle air-fuel mixture flows prior to the entrance of said idle air-fuel mixture into said cylinders.

5. The apparatus of claim 4 wherein said means through which said idle air-fuel mixture flows comprises passageway means.

6. The apparatus of claim 5 wherein said passageway means comprises a narrow passageway or channel having an inlet and at least one outlet.

7. The apparatus of claim 1 wherein said means for conducting exhaust gases from said engine to said heat exchanger means has control means connected thereto for controlling the amount of exhaust gases flowing through said heat exchanger means.

8. The apparatus of claim 1 wherein said carburetor mounting plate means has idle air-fuel mixture inlet means for transmitting said idle air-fuel mixture to said heat exchanger means.

9. In combination an internal-combustion engine and an apparatus for heating the air-fuel mixture and/or the idle air-fuel mixture of an internal-combustion engine having one or more cylinders prior to the entrance of the air-fuel mixture and/or idle air-fuel mixture into the cylinders of the engine comprising:
   a. heat exchanger means for heating said air-fuel mixture and/or said idle air-fuel mixture including (i) internal chamber means through which exhaust gases flow to heat said heat exchanger means, (ii) internal wall means disposed in said chamber means, said wall means defining cylindrical passage means extending through said chamber means, (iii) tube means disposed in said passage means through which said air-fuel and/or idle air-fuel mixture flows, said tube means including lip means therein for increasing the turbulence of said air-fuel mixture, (iv) internally disposed passageway means having at least one inlet and at least one outlet through which said idle air-fuel mixture flows,
   b. carburetor mounting plate means connected to said heat exchanger means disposed upstream thereof for connecting at least one carburetor means to said heat exchanger means and including chamber means for receiving said air-fuel mixture from said carburetor means and for receiving said idle air-fuel mixture from said outlet means of said passageway means,
   c. engine mounting plate means connected to said heat exchanger means downstream thereof for connecting said heat exchanger to said engine and including chamber means generally aligned with said tube means for receiving said air-fuel and/or said idle air-fuel mixture heated by said heat exchanger,
   d. means for conducting exhaust gases from said engine to said heat exchanger means,
   e. and means for conducting said idle air-fuel mixture from at least one of said carburetor means to said passageway means.

10. The apparatus of claim 9 wherein said tube means comprises hollow, open-ended, generally cylindrical-shaped tubes.

11. The apparatus of claim 9 wherein said means for conducting exhaust gases from said engine to said heat exchanger means has control means connected thereto for controlling the amount of exhaust gases flowing through said heat exchanger means.

12. The apparatus of claim 1 wherein said carburetor mounting plate means has idle air-fuel mixture inlet means for transmitting said idle air-fuel mixture to said heat exchanger means.

* * * * *

UNITED STATES PATENT AND TRADEMARK OFFICE
CERTIFICATE OF CORRECTION

PATENT NO. :   3,972,313
DATED      :   August 3, 1976
INVENTOR(S):   Frederick J. Marsee It is certified that error appears in the above–identified patent and that said Letters Patent are hereby corrected as shown below:

Claim 1, Column 3, Lines 28 and 29, 31 and 32, 34, 47 and 48, 54 and 55, and 60 and 61 -- "and/or the idle air-fuel mixture" should be deleted.

Signed and Sealed this

Fifteenth Day of February 1977

[SEAL]

Attest:

RUTH C. MASON
*Attesting Officer*

C. MARSHALL DANN
*Commissioner of Patents and Trademarks*